April 30, 1963 R. P. DANIEL 3,087,352
SAFETY STEERING WHEEL
Filed Feb. 16, 1962 2 Sheets-Sheet 1
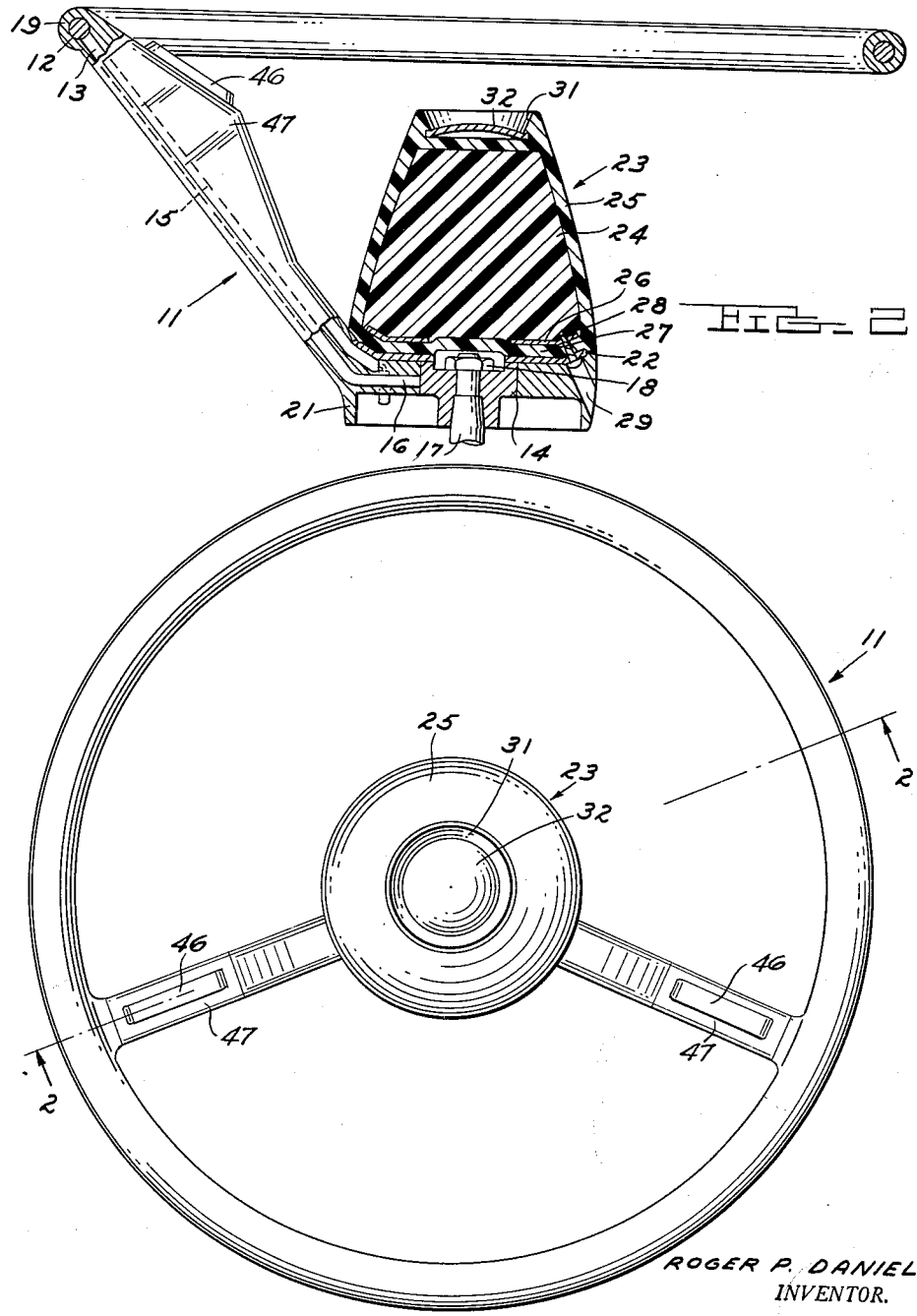
ROGER P. DANIEL
INVENTOR.
BY J. R. Faulkner
J. J. Roethel
ATTORNEYS April 30, 1963 R. P. DANIEL 3,087,352
SAFETY STEERING WHEEL
Filed Feb. 16, 1962 2 Sheets-Sheet 2

ROGER P. DANIEL
INVENTOR

BY John R. Faulkner
John J. Roethel
ATTORNEYS

United States Patent Office 3,087,352
Patented Apr. 30, 1963

3,087,352
SAFETY STEERING WHEEL
Roger P. Daniel, Dearborn, Mich., assignor to Ford Motor Company, Dearborn, Mich., a corporation of Delaware
Filed Feb. 16, 1962, Ser. No. 176,848
11 Claims. (Cl. 74—552)

This invention relates to safety steering wheels and more particularly to impact energy absorbing steering wheels for automobiles.

This application is a continuation-in-part of my co-pending application Serial No. 27,912 filed May 9, 1960 and now abandoned.

The energy absorbing concept in the design of safety-type steering wheels, first used on a large scale on motor vehicles of the 1956 model year, was the result of observations which indicated that many fatal injuries sustained from driver contact with the steering wheel during collisions were caused by the crushing or penetration of the chest by the relatively small and rigid steering wheel hub. Accordingly, a recessed hub steering wheel was developed to provide collapsible distance between the rim and its supporting spoke structure and the hub. This type steering wheel relies on the substantial area of the rim opposing the driver's chest to distribute the impact load and prevent localized high pressure concentrations.

Although the incidence of crushing-type chest injuries has been substantially reduced by the use of recessed hub-type steering wheels when compared to the previously used nonrecessed small hub steering wheel design, the incident of less severe injuries has not been reduced. The current conventional production recessed hub steering wheels have a rigid hub area and a stiff rim which is supported by comparatively rigid spokes. Lacerative or bruising injuries can be inflicted on the chest, face, neck or abdomen of the driver when the wheel is impacted at moderate speed. The majority of collisions result in low to moderate speed occupant impact against the steering wheel. As a result, unless the present safety-type steering wheel is evaluated only on the basis of reduction in critical through fatal injuries, its injury reducing advantages are obscure since a preponderance of steering wheel injuries are in the range of minor through severe classifications.

It is the object of the present invention to provide further improvements in safety steering wheels. The improved steering wheels are constructed and arranged to reduce the possibility of the less serious injuries which occur in the majority of automobile accidents while also providing a higher level of protection against crushing and penetrating injuries than is provided by the recessed hub steering wheel presently in use.

The present invention embodies a two stage energy absorption steering wheel having its attachment hub recessed below the plane of the outer rim. The steering wheel comprises an annular rim mounted on flexible steel spokes which extend upwardly from a base plate member. The base plate member is adapted to be rotatably journaled on the upper end of the steering column and coupled as by splines to the steering shaft for transmitting turning movement of the steering wheel to the steering shaft. An impact structure is provided intermediate the base plate and the annular rim of the steering wheel. This impact structure, which may be formed of a substantially rigid foam material, absorbs impact energy as it deforms under load. This foam material may be covered with a layer of resilient cushion material to minimize soft tissue injuries and distribute the load over a large area of the chest. Upon impact of the driver with the steering wheel, the spoke means flexibly resists the movement of the rim towards the hub to provide a first stage of energy absorption, and the deformation of the impact structure provides a second stage of energy absorption in case the impact load is in excess of that causing the first stage of energy absorption.

Other objects, advantages and features of this invention will be made more apparent as this description proceeds, particularly when considered in connection with the accompanying drawings, wherein:

FIGURE 1 is a plan view of a steering wheel incorporating one embodiment of this invention;

FIGURE 2 is a sectional view taken substantially through the line 2—2 of FIGURE 1 looking in the direction of the arrows; and, FIGURE 3 is a sectional view of a steering wheel incorporating a second embodiment of this invention.

Figure 3:
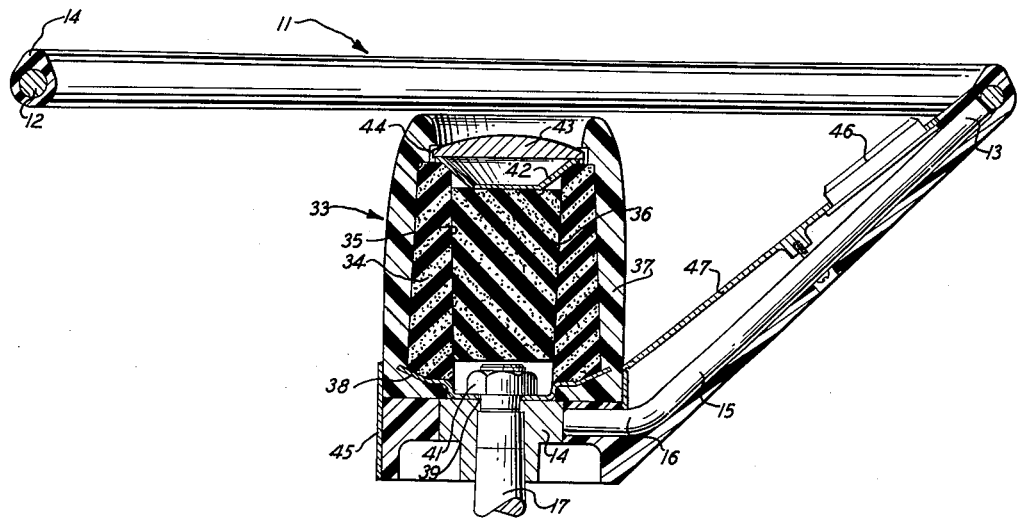

The steering wheel, generally designated 11, embodying the present invention as seen in FIGURES 1 and 2 comprises an armature or frame structure having an annular steel rim 12, steel spokes 13 which are preferably in the form of cylindrical rods, and an attachment hub 14. These members are rigidly welded to one another. It will be noted that each spoke 13 has an elongated downwardly and inwardly inclined section 15 terminating in a short substantially horizontal section 16, the end of the horizontal section being welded to the attachment hub 14. The attachment hub is preferably a splined element adapted to fit over splines (not shown) on the upper end of a steering shaft 17. A suitable nut 18 is used to retain the steering wheel assembly on the steering shaft 17 in a conventional manner. The steering wheel rim 12 and the spokes 13 are preferably covered with hard rubber or other suitable material, as indicated at 19. As shown, the attachment hub 14 is also covered with the covering material 19, this material being molded to form an enlarged lower hub section 21. Welded or otherwise fastened to the upper surface of the attachment hub 14 is a dish-shaped plate member 22. This plate member 22 forms a support for the impact cone structure 23 of the first embodiment of this invention.

The impact cone structure 23 is a premolded assembly and as best seen in FIGURE 2 comprises a frustum-shaped inner core 24 molded of a plastic foam material of a type which will give a substantially rigid structure. The inner core 24 is covered with a layer of resilient foam forming a soft cushion pad 25. It will be noted that a dish-shaped plate member 26 is interposed between the bottom of the inner core 24 and the lower layer 27 of the cushion pad. This dish-shaped member 26 is complementary in shape to the dish-shaped member 22 attached at the upper surface of the attachment hub 14. Suitable fastening devices 28, such as self-tapping screws, are inserted through openings 29 in the lower hub section 21 so as to fasten the inner or upper plate member 26 to the lower plate member 22 to retain the impact cone structure 23 on the steering wheel. The upper surface 31 of the impact cone structure 23 may be recessed to receive an emblem 32 or other suitable ornament, as is usually found in the center of most vehicle steering wheels.

In a second embodiment of this invention as shown in FIGURE 3, the steering wheel 11 also comprises a rigid welded frame structure having an annular steering rim 12, steel spokes 13 and an attachment hub 14 similar in structure to the first embodiment shown in FIGURE 2. The attachment hub 14 is adapted to fit over the upper end of the steering shaft 17 to prevent relative movement between the two parts.

As seen in FIGURE 3, the steering wheel 11 is provided with an impact structure 33 comprising a substantially rigid foam cylinder 34 having a tapered cavity 35 to receive a preformed rigid foam core 36. The cylinder 34 is covered with an outer layer of a resilient soft cushion material 37. A backup plate 38 is molded into the impact structure 33 intermediate the base of the cylinder 34 and a portion of the outer layer 37. An opening 39 is provided in the center portion of the backup plate 38 to permit fitting the impact structure 33 over the extending end of the steering shaft 17. The impact structure 33 may be assembled to the steering shaft 17 by tightening a nut 41 on the extended threaded end portion of the steering shaft 17. The tapered core 36, which is also manufactured from a substantially rigid foam material, is inserted into the cavity 35 to cover the exposed portion of the steering shaft 17 with an energy absorbing material. A cup-shaped plate 42 is installed over the core 36 to hold the latter in place. An emblem 43, or any other type of ornament, is mounted over the plate 42 and held securely in position by having its peripheral edge received by a recess 44 provided between the upper surface of the cylinder 34 and the outer layer 37. A vertically extending cup 45 encompasses the central hub structure of the steering wheel to facilitate the alignment of the impact structure 33 with the steering wheel 11. Thus, it can be seen that the attachment of the impact structure 33 to the steering wheel 11 as illustrated in FIGURE 3 is greatly simplified since no screws are required for its assembly.

It will be noted that the steering wheels 11 illustrated in FIGURES 1, 2 and 3 are of the two-spoke type on which suitable horn operators 46 may be mounted on the spokes 13. The construction and arrangement of the horn operators 46 form no direct part of the present invention. The only requirement is that the material of which the housing 47 for each horn operator 46 is formed be such that it will not be a potential source of injury in itself.

From the foregoing it is thus seen that the steering wheel structure of this invention provides for a two-stage energy absorption in which the first stage results from the flexing of the spoke supporting structure and the second stage results from the deformation of the impact structures 23 and 33. The manner in which the rigid rim 12 is mounted on the spoke support structure allows for its axial displacement upon the application of a relatively low force. The impact structures 23 and 33 provide an energy absorbing impact surface due to its rigid foam construction. These structures are able to absorb impact energy as they deform under load. The covering of the substantially rigid foam materials of the impact structures 23 and 33 with a layer of resilient cushion material minimizes soft tissue injury and distributes the load over a larger area of the chest. The angle which the spokes make within the longitudinal center line of the steering post is substantially equal to that found in current production recessed hub-type steering wheels and provides a minimum of knee interference. Since the rim and spokes provide only a portion of the energy absorbing capacity for the entire steering wheel assembly during impact loading, a two-spoke configuration, as shown, is feasible and the spokes may be of a relatively light construction with any desired spacing to minimize line of sight interference with the instrument panel. Also, it is to be noted that the impact cone structures for the steering wheel are effective in providing a second stage of energy absorption under an impact load acting thereon from any direction normal to the plane of the rim when the latter is in a displaced position. This has the additional advantage of protecting the driver or the passenger seated next to the driver upon impact with the steering wheel when the wheel is turned or if the impact force is in a direction other than longitudinal of the vehicle as in case of a side collision. The foregoing construction and arrangement thereby provides a safety steering wheel having the foregoing and other advantages over a conventional recessed hub-type wheel design.

It will be understood that the invention is not to be limited to the exact construction shown and described, but that various changes and modifications may be made without departing from the spirit and scope of the invention as defined in the appended claims.

I claim:

1. A safety steering wheel comprising a rim, a hub, and spoke means supporting said rim on said hub, said spoke means comprising elongated members intersecting the plane of said rim at an angle and extending downwardly and inwardly toward said hub and being attached thereto whereby said rim is axially spaced from said hub along the axis of said steering wheel, said spoke means flexibly resisting movement of said rim toward said hub to provide a first stage of energy absorption by said steering wheel under an impact load, an impact structure independently mounted on and extending substantially upwardly from said hub and terminating below the normal plane of said rim, said impact structure comprising an impact energy absorbing material effective to provide a second stage of energy absorption by said steering wheel under an impact load in excess of that causing said first stage of energy absorption.

2. A safety steering wheel comprising a rim, a hub, and spoke means supporting said rim on said hub, said spoke means comprising elongated members intersecting the plane of said rim at an angle and extending downwardly and inwardly toward said hub and being attached thereto whereby said rim is axially spaced from said hub along the axis of said steering wheel, said spoke means flexibly resisting movement of said rim toward said hub to provide a first stage of energy absorption by said steering wheel under an impact load, a central impact structure independently mounted on and extending upwardly from said hub and terminating below the normal plane of said rim, said impact structure being deformable in response to an impact load acting thereon from any direction normal to the plane of said rim, said deformation of said impact structure effective to provide a second stage of energy absorption by said steering wheel under an impact load in excess of that causing said first stage of energy absorption.

3. A safety steering wheel comprising a rim, a hub, and spoke means supporting said rim on said hub, said spoke means comprising elongated members intersecting the plane of said rim at an angle and extending downwardly and inwardly toward said hub and being attached thereto, the plane of said rim being normally spaced from said hub along the axis of said steering wheel, said spoke means flexibly resisting movement of said rim toward said hub to provide a first stage of energy absorption by said steering wheel under an impact load, a central impact structure independently mounted on and extending substantially axially upwardly from said hub and terminating below the normal plane of said rim, said impact structure comprising a core of energy absorbing material, said core being effective to absorb energy as it deforms under an impact load in excess of that causing said first stage of energy absorption by said rim supporting structure.

4. A safety steering wheel comprising a rim, a hub, and spoke means supporting said rim on said hub, said spoke means comprising elongated members intersecting the plane of said rim at an angle and extending downwardly and inwardly toward said hub and being attached thereto, the plane of said rim normally being spaced from said hub along the axis of said steering wheel, a central impact structure independently supported on said hub and terminating below the normal plane of said rim, the distance from the hub to the terminal end of said impact structure being greater than the distance of said terminal end to the normal plane of said rim, said spoke means flexibly resisting movement of said rim in a direction in which the plane thereof will intersect said impact structure, such movement of said rim being caused in response to an impact load resulting in a first stage of energy absorption by said steering wheel, said central impact structure being deformable with energy absorbing effect upon said steering wheel being subjected to an impact load in excess of that causing said first stage of energy absorption, the deformation of said impact structure resulting in a second stage of energy absorption by said steering wheel.

5. A safety steering wheel comprising a rim, a hub, and spoke means supporting said rim on said hub, said spoke means comprising elongated members intersecting the plane of said rim at an angle and extending downwardly and inwardly toward said hub and being attached thereto, the plane of said rim normally being spaced from said hub along the axis of said steering wheel, a central impact structure independently supported on said hub and terminating below the normal plane of said rim, the distance from the hub to the terminal end of said impact structure being greater than the distance of said terminal end to the normal plane of said rim, said spoke means flexibly resisting movement of said rim in a direction in which the plane thereof will intersect said cone structure, such movement of said rim caused in response to an impact load resulting in a first stage of energy absorption by said steering wheel, said central impact structure comprising a core of energy absorbing material deformable when said steering wheel is subjected to an impact load in excess of that causing said first stage of energy absorption, said entire impact structure being deformable in response to an impact load acting thereon in any direction, the deformation of said core resulting in a second stage of energy absorption by said steering wheel.

6. A safety steering wheel comprising a rim, a hub, and spoke means supporting said rim on said hub, said spoke means comprising elongated members intersecting the plane of said rim at an angle and extending downwardly and inwardly toward said hub and being attached thereto, the plane of said rim normally being spaced from said hub along the axis of said steering wheel, a central impact structure independently supported on said hub and terminating below the normal plane of said rim, the distance from the hub to the terminal end of said impact structure being greater than the distance of said terminal end to the normal plane of said rim, said spoke means flexibly resisting movement of said rim in a direction in which the plane thereof will intersect said impact structure, such movement of said rim being caused in response to an impact load resulting in a first stage of energy absorption by said steering wheel, said central impact structure comprising a core of energy absorbing material covered by a resilient layer and being deformable when said steering wheel is subjected to an impact load in excess of that causing said first stage of energy absorption, the deformation of said core resulting in a second stage of energy absorption by said steering wheel.

7. A safety steering wheel comprising a rim, a hub, and spoke means supporting said rim on said hub, said spoke means comprising elongated members intersecting the plane of said rim at an angle and extending downwardly and inwardly toward said hub, the plane of said rim normally being spaced from said hub along the axis of said steering wheel, a central frustum-shaped impact cone structure supported on said hub and terminating below the normal plane of said rim, the distance from the hub to the terminal end of said cone structure being greater than the distance of said terminal end to the normal plane of said rim, said spoke means flexibly resisting movement of said rim in a direction in which the plane thereof will intersect said cone structure, such movement of the rim in response to an impact load resulting in a first stage of energy absorption by said steering wheel, said central cone structure comprising a core of energy absorbing foam material which is deformable when said steering wheel is subjected to an impact load in excess of that causing said first stage of energy absorption, the deformation of said core resulting in a second stage of energy absorption by said steering wheel, said core being covered by a layer of resilient material to provide a cushioned layer.

8. A safety steering wheel comprising a rim, a hub, and spoke means supporting said rim on said hub, said spoke means comprising elongated members intersecting the plane of said rim at an angle and extending downwardly and inwardly toward said hub, the plane of said rim normally being spaced from said hub along the axis of said steering wheel, a central frustum-shaped impact cone structure supported on said hub and terminating below the normal plane of said rim, the distance from the hub to the terminal end of said impact cone structure being greater than the distance of said terminal end to the normal plane of said rim, said spoke means flexibly resisting displacement of said rim in a direction in which the plane thereof will intersect said impact structure, such displacement of the rim caused in response to an impact load resulting in a first stage of energy absorption by said steering wheel, said central impact cone structure comprising a core of energy absorbing foam material which is deformable when said steering wheel is subjected to an impact load in excess of that causing said first stage of energy absorption, said central impact cone structure being deformable in response to an impact load acting thereon from any direction normal to the plane of said rim when the latter is in a displaced position, the deformation of said core resulting in a second stage of energy absorption by said steering wheel.

9. A safety steering wheel comprising a rim, a hub, and spoke means supporting said rim on said hub, said spoke means comprising elongated members intersecting the plane of said rim at an angle and extending downwardly and inwardly toward said hub, the plane of said rim normally being spaced from said hub along the axis of said steering wheel, a central generally frustum-shaped impact cone structure supported on said hub and terminating below the normal plane of said rim, the distance from the hub to the terminal end of said cone structure being greater than the distance of said terminal end to the normal plane of said rim, said spoke means flexibly resisting displacement of said rim in a direction in which the plane thereof will intersect said cone structure, such displacement of the rim in response to an impact load resulting in a first stage of energy absorption by said steering wheel, said central cone structure comprising a core of energy absorbing foam material covered by a cushioned layer and which is deformable when said steering wheel is subjected to an impact load in excess of that causing said first stage of energy absorption, said central cone structure being deformable in response to said impact load acting thereon from any direction normal to the plane of said rim when the latter is in a displaced position, the deformation of said core resulting in a second stage of energy absorption by said steering wheel.

10. A safety steering wheel comprising a rim, a hub, and spoke means supporting said rim on said hub, said spoke means comprising elongated members intersecting the plane of said rim at an angle extending downwardly and inwardly toward said hub, the plane of said rim normally being spaced from said hub along the axis of said steering wheel, an impact structure extending substantially axially from said hub and terminating below the normal plane of said rim, said spoke means flexibly resisting the displacement of said rim in a direction in which the plane thereof will intersect said impact structure, such displacement of said rim being caused in response to an impact load resulting in a first stage of energy absorption by said steering wheel, said impact structure comprising a substantially rigid foam cylinder having a cavity, said cylinder being affixed to said hub, a core of relatively rigid foam material insertable in said cavity, said impact structure being deformable when said steering wheel is subjected to an impact load in excess of that causing said first stage of energy absorption, the deformation of said impact structure resulting in a second stage of energy absorption by said steering wheel.

11. A safety steering wheel comprising a rim, a hub, and spoke means supporting said rim on said hub, said spoke means comprising elongated members intersecting the plane of said rim at an angle extending downwardly and inwardly toward said hub, the plane of said rim normally being spaced from said hub along the axis of said steering wheel, a central impact structure extending substantially axially from said hub and terminating below the normal plane of said rim, said spoke means flexibly resisting the displacement of said rim in a direction in which the plane thereof will intersect said impact structure, such displacement of said rim being caused in response to an impact load resulting in a first stage of energy absorption by said steering wheel, said impact structure comprising a relatively rigid foam cylinder having a cavity, said cylinder being affixed to said hub, a core of a relatively rigid foam material insertable in said cavity, a resilient soft cushion material covering said cylinder, said impact structure being deformable when said steering wheel is subjected to an impact load in excess of that causing said first stage of energy absorption, said central impact structure being deformable in response to said impact load acting thereon from any direction normal to the plane of said rim when the latter is in a displaced position, the deformation of said impact structure resulting in a second stage of energy absorption by said steering wheel.

References Cited in the file of this patent
UNITED STATES PATENTS

| | | |
|---|---|---|
| 2,894,413 | Schmid | July 14, 1959 |
| 2,913,924 | Pratt | Nov. 24, 1959 |
| 2,946,869 | Parks et al. | July 26, 1960 |
| 3,016,764 | Fredericks et al. | Jan. 16, 1962 |

FOREIGN PATENTS

| | | |
|---|---|---|
| 751,438 | France | June 19, 1953 |
| 65,850 | France | Nov. 16, 1955 |
| | (Addition to No. 1,090,586) | |
| 66,774 | France | Mar. 18, 1957 |
| | (Addition to No. 1,090,586) | |